UNITED STATES PATENT OFFICE.

WILLIAM BURNET, OF CHICAGO, ILLINOIS.

IMPROVEMENT IN ARTIFICIAL MARBLE, AND PROCESSES OF MOLDING THE SAME.

Specification forming part of Letters Patent No. 161,005, dated March 23, 1875; application filed March 3, 1875.

*To all whom it may concern:*

Be it known that I, WILLIAM BURNET, of the city of Chicago, county of Cook, State of Illinois, have invented a new and useful Compound for the Production of Artificial Marble, of which the following is a specification:

My invention consists in the use, with other material hereinafter named, of a cement called Keene's cement, which is said to be made of sulphate or carbonate of lime, or both, mixed with a solution of alum, and then heated until all the water, in combination with the lime, is dissipated. It is then powdered and sifted, and packed in casks ready for use.

With potash and alum, or a solution of potash-alum, combined with Keene's cement I make a paste, and while in its plastic state mold it into ornaments in relief—busts, statues, flooring of bath-rooms, vestibules, table and stand tops, sepulchral monuments, and for all purposes for which natural marbles are used.

Plaster of paris used with a chemical solution of potash-alum and lime-water makes my artificial marble, when treated with carbonic-acid gas.

When sufficiently hard, remove it from the mold.

In order to dry and harden it more speedily, generate carbonic-acid gas in a close room (containing the marble-work) by means of a suitable portable furnace made of sheet-iron filled with red-hot coals of coke or charcoal. While the gas is generating, the marble is absorbing it, and drying and carbonizing itself by the same process.

After experimenting with various kinds of potash-alum, I find the best for my work is that manufactured by the Tacony Chemical Works, of Philadelphia.

I call my composition "The Burnet Manufactured Marble."

By adding suitable coloring matter to the composition while in a plastic state, I can produce durable and beautiful imitations of every variety of marble at a very small expense.

When thoroughly dried, it can be polished in the same manner in which natural marbles are polished.

Other cements or plaster the equivalent of Keene's, and which, like it, are capable of being worked into artificial marble, may also be used in its stead.

For molding this marble, I use wooden molds coated with varnish or other suitable material.

I never oil my molds, but polish them so highly that the cement or plaster will not adhere to them, but deliver themselves from the mold by slightly tapping.

I can use china, glass, earthen, or stone ware molds, or any kind of metal molds.

What I claim, and desire to secure by Letters Patent, is—

1. The artificial or manufactured marble described, made from Keene's or other equivalent cement or plaster, composed in part or entirely of sulphate or carbonate of lime, or both, in combination with potash-alum, or with potash and alum, and either with or without lime-water.

2. The process of molding artificial marble in varnished, polished, or glazed molds, as described.

3. The process of molding artificial marble in wooden molds, or their equivalents, without the necessity of the interposition of oleaginous matter, as described.

WILLIAM BURNET.

Witnesses:
 WALTER BURNHAM,
 R. H. MASON.